US006865385B1

United States Patent
Kohda et al.

(10) Patent No.: US 6,865,385 B1
(45) Date of Patent: Mar. 8, 2005

(54) STATUS NOTIFICATION METHOD AND STATUS NOTIFICATION SYSTEM

(75) Inventors: Youji Kohda, Kawasaki (JP); Naohisa Kawaguchi, Kawasaki (JP); Akinori Iwakawa, Kawasaki (JP); Takashi Ono, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/560,000

(22) Filed: Apr. 28, 2000

(30) Foreign Application Priority Data

Jun. 30, 1999 (JP) .......................................... 11-185803

(51) Int. Cl.[7] .............................................. H04M 3/42
(52) U.S. Cl. ................ 455/414.1; 455/41.2; 455/432.1; 455/435.2; 455/552.1; 709/218; 709/230
(58) Field of Search ................ 455/41.2, 412, 455/414, 422, 432, 435, 466, 518, 550, 552.1; 379/88.12, 88.21; 370/310.2, 352, 356, 310; 709/218, 230

(56) References Cited

U.S. PATENT DOCUMENTS

| 5,530,914 A | * | 6/1996 | McPheters .................. 455/518 |
| 5,758,291 A | * | 5/1998 | Grube et al. ................ 455/518 |
| 5,850,611 A | * | 12/1998 | Krebs .......................... 455/518 |
| 5,889,839 A | * | 3/1999 | Beyda et al. ............. 379/88.12 |
| 6,192,394 B1 | * | 2/2001 | Gutfreund et al. .......... 709/204 |
| 6,366,771 B1 | * | 4/2002 | Angle et al. ............. 455/414.1 |
| 6,393,014 B1 | * | 5/2002 | Daly et al. .................. 370/352 |
| 6,512,930 B2 | * | 1/2003 | Sandegren .................. 455/518 |
| 6,549,534 B1 | * | 4/2003 | Shaffer et al. ............... 370/355 |

* cited by examiner

Primary Examiner—William Trost
Assistant Examiner—Stephen D'Agosta
(74) Attorney, Agent, or Firm—Staas & Halsey LLP

(57) ABSTRACT

To enable reporting user status more precisely and over a wide range, the present invention includes an information terminal PC1 having a generating device, a mobile terminal M having a transmitting device, and an information terminal PC2 having a receiving device. The information terminal PC1 and the mobile terminal M can communicate directly wirelessly or through a wire. The mobile terminal M and the information terminal PC2 can communicate in real time via status notification devices. The information terminal PC1 reports the user status it detected to a mobile terminal M that is in a communicable area. The mobile terminal M sends the user status to the information terminal PC2 via the status notification device if the user status it received is the status of the user that has been stored therein in advance. If the user carries a mobile terminal M while he is on the trip, the status can be reported from the information terminal PC1 to the information terminal PC2 regardless of whether the information terminal PC1 belongs to a network or whether the information terminal PC1 has a certain status notification device.

20 Claims, 6 Drawing Sheets

| Status ID | Message |
|---|---|
| 1 | You have a lot of mail. |
| 2 | You have mail. |
| 3 | You have no mail. |
| 4 | Mail in preparation. |

STATUS NOTIFICATION METHOD AND STATUS NOTIFICATION SYSTEM

BACKGROUND OF THE INVENTION

1. Technical Field

The present invention relates to technologies that notify users of other users' status.

2. Description of Related Art

In the present invention, "status notification devices" mean devices that are interconnected via a network and enable real-time exchanged transmission/reception of stored user status items. In some cases, user status is configurable on a status notification device automatically or by a user; in other cases, it is reported from a different detection means to the status notification device.

Recently, there have been offered various status notification devices that can report user status of a user on a network to another user in real time. These status notification devices are utilized to facilitate communications between users. For instance, a user can start a communication that suits the other user's situation by obtaining the user status of the other user from the status notification device. Similarly, a user can receive a service that suits his status by notifying others of his status using the status notification device.

One such typical status notification device is "ICQ" (Mirabilis, Ltd.), which is offered on the Internet. ICQ is devices, and a system including the devices interconnected via the Internet, that accept user status and text message settings, and that enable exchange-notification of the set content in real time.

By using ICQ, a user can find out who are the other users that are connected to the Internet. On ICQ, a user A designates another user B as a user to whom his status can be shown as needed. Thus, the other user B can find out user A's status on ICQ in real time. However, this status notification is available only when both users A and B are connected to the Internet. There are numerous other status notification devices other than ICQ, which have similar functions.

There has been proposed a status notification device that combines a conversation device such as IRC (Internet Relay Chat, RFC1459) and a status detection device. With this type of status notification device, change in user status is detected, and the new user status is reported to other users in a virtual space via the conversation device. Therefore, users who share the same virtual space can be notified of each other's status in real time. There are some status notification devices that allow users mutually to send and/or receive user status via their conversation devices, even when the users' status notification devices do not share the same virtual space.

A user who frequently goes on business trips, for example, does not always have an access to the Internet or to a conversation system. On the other hand, for other users, it is just this user status that they want to be notified of in real time. However, status notification devices such as the aforementioned ICQ can only handle the user status of users who are connected to the Internet. Status notification devices having conversation devices can only handle the status of users who participate in a virtual space or are connected to a conversation system. In other words, if a user is not connected to ICQ or a conversation system, the user's status will not be reported to other users.

Furthermore, the aforementioned conventional status notification devices are based on the assumption that exchange-transmitted/received user status is whichever of the status items in a status list that is shared by the status notification devices. For instance, ICQ is provided with a predetermined list having status items such as "idle" and "away," wherein user status is selected from the status list. However, in this arrangement, the accuracy of the status of a user is pre-limited by the status list. Therefore, user status cannot be reported more precisely.

SUMMARY OF THE INVENTION

The object of the present invention is to provide a technology that lifts restrictions on the network, moreover to give a detailed report of user status in real time.

To solve the aforementioned problem, a first aspect of the invention provides a status notification method wherein:

A: a first information terminal determines a status of a user who uses the information terminal based on a status of the first information terminal, and sends the user status directly to any mobile terminal wirelessly or through a wire; and B: the mobile terminal determines whether or not the user status it received coincides with a user status that has been stored in the mobile terminal in advance, and based on the result of the determination sends the user status to a designated second information terminal via a network substantially in real time; and C: the second information terminal outputs the user status it received.

The first information terminal and the mobile terminal can directly communicate each other wirelessly. The mobile terminal and the second information terminal can communicate each other in real time via a network using a designated such as ICQ. The user status detected by the first information terminal is sent to the mobile terminal, and then to the second information terminal in real time. The second information terminal is notified of the user status by using a text message and/or an icon. Therefore, the user can report his/her status to others on the network or a specific system, regardless of whether the first terminal which is at the destination of a trip is connected to the same network or the system.

A second aspect of the present invention provides a status notification system having a generating device to be disposed in a first information terminal, a transmitting device to be disposed in a mobile terminal that is on a mobile communication network, and a receiving device to be disposed in a second information terminal. The mobile terminal and said second information terminal each has a communication device that can connect to another via a network and communicate substantially in real time.

The generating device determines a user and a user status based on a status of the first information terminal. Then the generating device connects directly to the transmitting device wirelessly or through a wire to send the user and the user status to any transmitting device.

The transmitting device is arranged to connect directly to the generating device wirelessly or through a wire. The transmitting device receives the user and the user status from any generating device. The transmitting device determines whether or not the user is a user that corresponds to the mobile terminal, and based on the result of the determination sends the user status it received to designated receiving devices via the communication device.

The receiving device receives the user status from the receiving device via the communication device to output the user status it received.

To report user A's status to an information terminal PC2 of user B, the user A carries a mobile terminal such as a portable phone while he is on the move, and utilizes an information terminal PC1 once he is at the destination. The generating, device of the information terminal PC1 and the transmitting device of the mobile terminal can be directly connected by low-powered wireless communication. The mobile terminal and the information terminal PC2 each includes a communication device such as ICQ, which can communicate with another via the Internet in real time.

The generating device determines user A's status based on a status of the running application. The generating device then sends the user A's status to the mobile terminal. For instance, if the information terminal PC1 has many unread mails, the status "You have a lot of mail" is sent to the mobile terminal. The transmitting device on the mobile terminal sends the user status it received to the information terminal PC2. The user status is sent by using a status notification device such as ICQ. The receiving device on the information terminal PC2 receives the user A's status via a status notification device such as ICQ, and reports the status to the user B.

Therefore, the user status can be reported to other users on the Internet or a specific system even if the information terminal PC1, which a user uses while he is on the move or at the destination of a trip is not connected to the Internet or the same system.

A third aspect of the present invention provides the status notification system of the second aspect, wherein the generating device creates a status list based on the status of the first information terminal. The status list has status items that can be a user status. The generating device specifies one of the status items as the user status and sends the status list it created and the user status it specified to the transmitting device. The transmitting device sends the user status and the status list to the receiving device. The receiving device receives and outputs the user status and the status list.

For instance, when an electronic mail device is operating on the first information terminal, the generating device creates three status lists: 1) You have a lot of mail; 2) You have mail; and 3) Writing mail. The generating device selects one of the status items that is adequate as the user status. The status list and the user status are sent from the generating device to the receiving device via the transmitting device, thereby notifying the user. In this case, each status can be assigned a designated status ID, such that the status ID can be sent as the user status.

A fourth aspect of the present invention provides a generating device to be disposed in an information terminal in which a predetermined application can run. The generating device includes identification means, determination means, and sending means. The identification means obtains identification information from the application. The identification information specifies a user. The determination means determines the status of a user based on a status of the application. The sending means sends the identification information and the user status to any mobile terminal. The sending means is arranged to connect directly to an external mobile terminal wirelessly or through a wire.

A predetermined application is not limited to any specific application. Examples of the application include an electronic mail device, a browser, an editor, and a screen saver. The identification means obtains from the application a password or a user name of the user who operates the application. If the application is an electronic mail device, the determination means determines the user status based on an accumulation status of mails received, and an input status of the electronic mail device. The sending means sends the identification information of the user and the user status to an external mobile terminal wirelessly or through a wire.

A fifth aspect of the present invention provides a transmitting device adapted to operate with a communication device on a mobile terminal that stores identification information of a user. The communication device is adapted to connect to another via a network so as to be able to communicate substantially in real time. The transmitting device includes receiving means, authorization means, and sending means.

The receiving means directly connects to any external information terminal wirelessly or through a wire for receiving identification information of the user and a user status from the information terminal. The authorization means authorizes the user based on the identification information it received and the identification information stored. The sending means sends via the communication device the user status it received to a designated another communication device.

The mobile terminal stores identification information of the user, such as an account name or a log in name. This identification information can be pre-configured along with a phone number and a serial number. The receiving means receives identification information of the user and a user status from the generating device of the fourth aspect of the present invention. The authorization means compares the user identification information it received and the user identification information that has been stored. If two of them coincide, the user status is sent from the sending means to a designated information terminal via the communication device.

A sixth aspect of the present information provides a transmitting device adapted to operate with a communication device on a mobile terminal. The communication device is adapted to connect to another via a network so as to be able to communicate substantially in real time. The transmitting device includes storing means, receiving means, authorization means, and sending means.

The storing means stores identification information of a user. The receiving means is arranged to connect to any external information terminal wirelessly or through a wire for receiving identification information of the user and a user status from the information terminal. The authorization means authorizes the user based on the identification information it received and the identification information stored. The sending means sends via the communication device the user status it received to a designated another communication device based on the result of the authorization.

This transmitting device is different from the transmitting device of the fifth aspect of the present invention in that this transmitting device deals with mobile terminals that do not store user identification information. Therefore, this transmitting device includes storing means in addition to the components of the transmitting device of the fifth aspect. The storing means stores identification information which is used for authorizing the user based on the identification information sent by the generating device of the fourth aspect. Such identification information includes the user's log in name and/or the account name. The manner of configuring identification information is not limited to any particular one. For instance, identification information can be registered through the input means of the mobile terminal, or by sending the identification information to the mobile terminal from another information terminal. It is also possible to retrieve identification information in advance from an external memory that stores identification information therein.

A seventh aspect of the present invention provides a receiving device adapted to operate with a communication device, the communication device being adapted to connect to another via a network so as to be able to communicate substantially in real time. The receiving device includes receiving means and outputting means. The receiving means receives via the communication device a user status from an external communication device. The outputting means outputs the user status it received.

For instance, the receiving device is disposed in an information terminal in which a status notification device such as ICQ is adapted to operate. The receiving device receives the user information sent by the generating device to output what it received on a display.

The eighth aspect of the present invention provides a computer-readable recording media having a status creation program stored therein. The status creation program is for use in an information terminal in which a predetermined application can run. The status creations program is adapted to execute steps of:

A: obtaining identification information that specifies a user from the application;

B: determining a status of the user based on a status of the application;

C: connecting directly to any external mobile terminal wirelessly or through a wire; and D: sending the identification information and the user status to the mobile terminals.

This aspect of the invention has similar effects as the fourth aspect of the present invention.

A ninth aspect of the present invention provides a computer-readable recording media having a status sending program stored therein. The recording media is for use in a mobile terminal having identification information of a user. A communication device is adapted to operate on the mobile terminal. The communication device is connected to another via a network so as to be able to communicate substantially in real time. The status sending program is adapted to execute steps of:

A: connecting directly to any external information terminal wirelessly or through a wire;

B: receiving identification information of the user and a user status from the information terminal;

C: authorizing the user based on the identification information it received and the identification information stored; and D: sending via the communication device the user status it received to a designated another communication device based on the result of the authorization.

This aspect of the invention has similar effects as the fifth aspect of the present invention.

A tenth aspect of the present invention provides a computer-readable recording media having a status sending program therein. The recording media is for use in a mobile terminal on which a communication device is adapted to operate. The communication device is adapted to connect to another via a network so as to be able to communicate substantially in real time. The status sending program is adapted to execute steps of:

A: memorizing identification information of a user;

B: connecting directly to any external information device wirelessly or through a wire;

C: receiving identification information of the user and a user status from the information terminal;

D: authorizing the user based on the identification information it received and the identification information stored; and E: sending via the communication device the user status it received to a designated another communication device based on the result of the authorization.

This aspect of the invention has similar effects as the sixth aspect of the present invention.

An eleventh aspect of the present invention provides a computer-readable recording media having a status receiving program therein. The recording media is for use in a mobile terminal on which a communication device is adapted to operate. The communication device is connected to another via a network so as to be able to communicate substantially in real time. The status receiving program is adapted to execute steps of:

A: receiving a user status from an external communication device via the communication device; and B: outputting the user status it received.

This aspect of the invention has similar effects as the sixth aspect of the present invention.

From the following detailed description in conjunction with the accompanying drawings, the foregoing and other objects, features, aspects and advantages of the present invention will become readily apparent to those skilled in the art.

DETAILED DESCRIPTION OF THE PREFERRED EMBODIMENTS

A status notification system, generating device, transmitting device, and receiving device in accordance with the present invention will now be explained with reference to figures.

First Embodiment

Overall Structure

Figure 1:
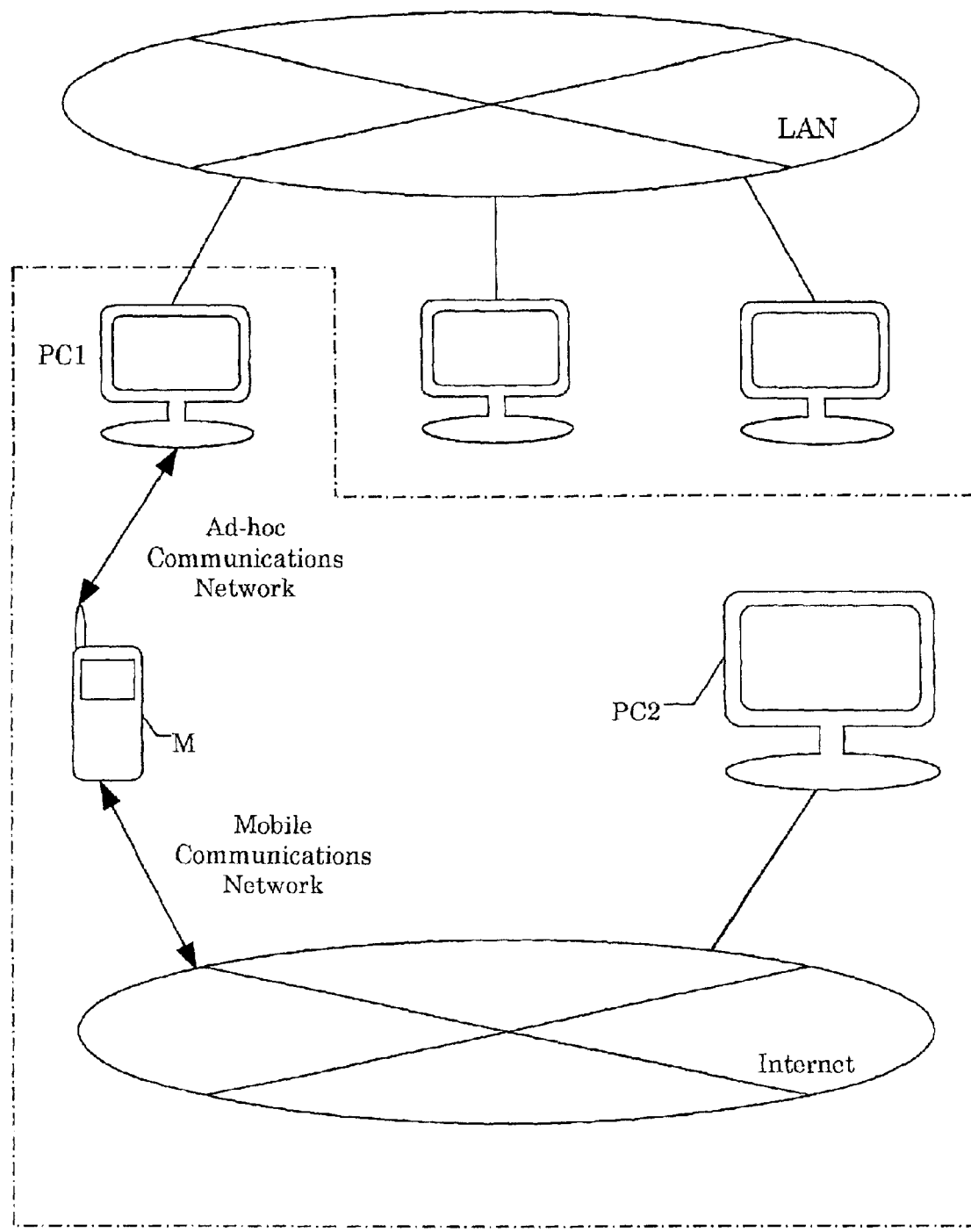
FIG. 1 is an overall structural view of a status notification system in accordance with the first embodiment.

FIG. 1 is a view of the overall structure of a status notification system 1 in accordance with a first embodiment of the present invention. The status notification system of the present embodiment includes a generating device, a transmitting device, and a receiving device. The generating device is disposed in an information terminal PC1 for running applications. The transmitting device is disposed in a mobile terminal M. The receiving device is disposed in an information terminal PC2.

The information terminal PC1 can either be independent from any network, or connected to a network such as a LAN (Local Area Network), the Internet, or an Intranet. The information terminal PC1 and the mobile terminal M are connected in an ad hoc manner. An "ad hoc" connection means a type of connection in which the connecting process is performed automatically without inputting information such as network address—these connections are referred to as so-called plug-and-play technology. Examples of such connection include JINI technology by Sun Microsystems and Universal Plug-And-Play by Microsoft. The mobile terminal M and the information terminal PC2 are connected to the Internet via a mobile communications network, such that status notification devices can report status items. Although only one mobile terminal M is shown in the figure for the sake of simplification, the system can include a plurality of mobile terminals M.

The description herein refers to a case in which a status notification system is used by a company for employee management purposes. The information terminal PC1 is, for instance, a PC (Personal Computer) or a WS (Work Station) that an employee presumably uses while he is on the move and/or while he is at a destination. The employee presumably always carries the mobile terminal M. It is assumed that the information terminal PC2 is either a server that collects status information of each employee, or a PC that a certain user uses.

Generating Device

Figure 2:
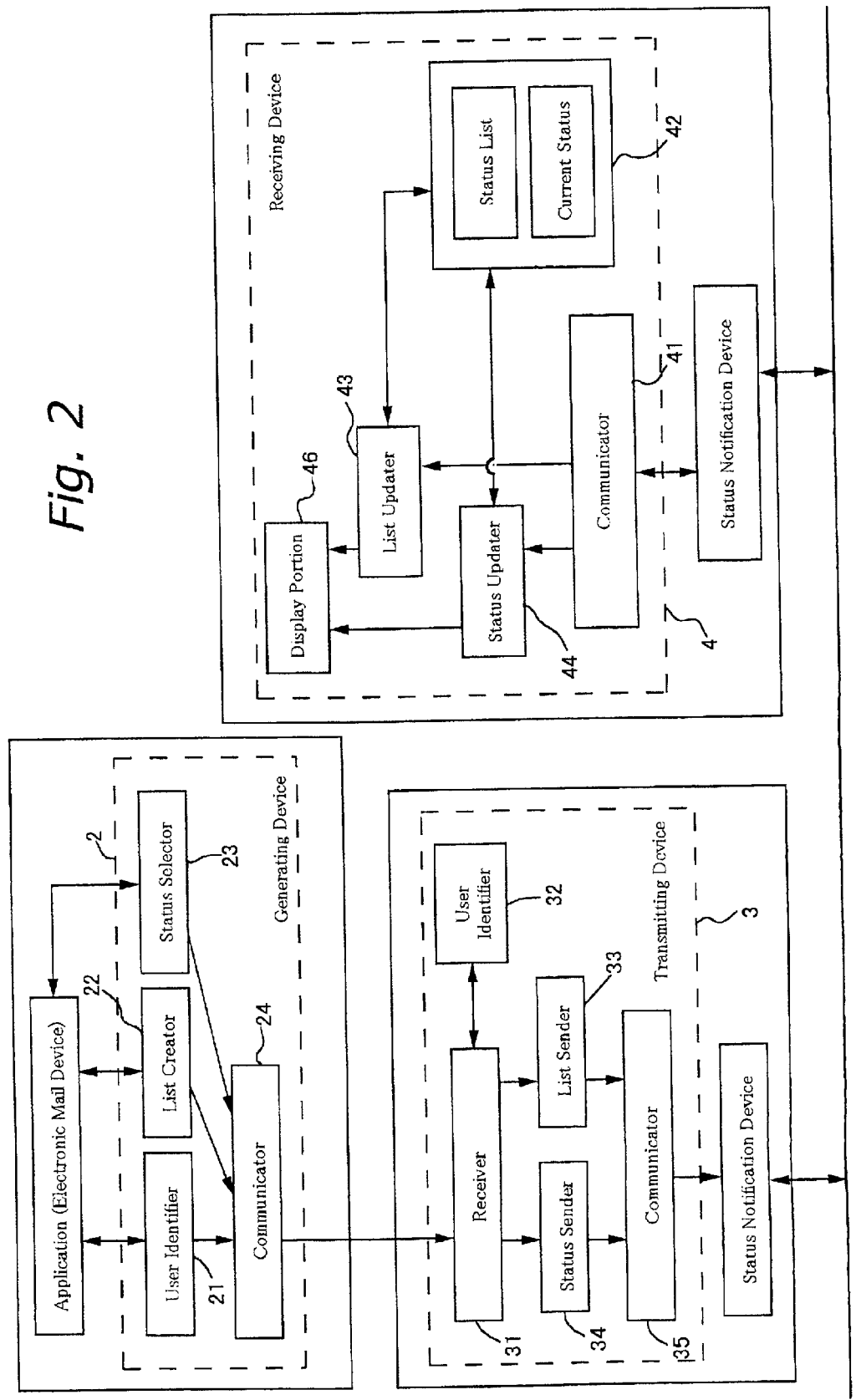
FIG. 2 is block chart showing functional structure of a generating device, a transmitting device, and a receiving device.

Referring now to FIG. 2, the block chart, a generating device 2, a transmitting device 3, and a receiving device 4 form the status notification device of the present embodiment.

The generating device 2 is provided on the information PC1 for running applications. The example taken in this embodiment is of the generating device 2 running an electronic mail device as the application. However, the application is not limited to an electronic mail device, and may also be an editor, a browser, or a screen saver. It is also possible to execute a plurality of applications, instead of only one application.

The generating device 2 includes a user identifier 21, a list creator 22, a status selector 23, and a communicator 24.

The user identifier 21 obtains from the application user identification information that identifies a user. For instance, the user identifier 21 obtains from the application a password or a user name that is inputted when booting the information terminal.

Figures 3, 4:
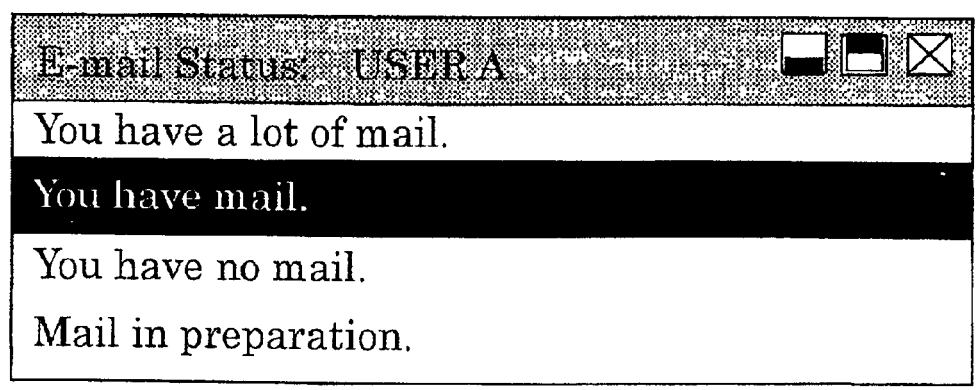
FIG. 3 is a conceptual view of an example of a status list.
FIG. 4 is an example of a status list and a current status being displayed.

The list creator 22 creates a status list in response to the application, and sends the status list to the communicator 24. The status list includes user status items that can be reported out based on the operational status of the application. FIG. 3 is a conceptual view of examples of user status items created in the present embodiment. The status list includes 4 status items: 1) You have a lot of mail; 2) You have mail; 3) You have no mail; and 4) Writing mail. In FIG. 3, the status list stores text data, which indicates each status. The status items can also include graphical data in addition to or instead of text data. The status items can also include sound data in addition to the foregoing data.

For instance, if the application is a text editor, the list creator 22 creates a status list (not shown) having three status items: 1) Editing File; 2) Printing File; and 3) Displaying File.

Further, if the application is an Internet phone device, the list creator 2 creates two status lists (not shown) for the time when the user is calling someone: 1) Receiving Call from "###-###-####"; and 2) Calling "###-###-####," wherein "###-###-####" is a communication address. The list creator 2 also creates a status list "Waiting" (not shown) for when the user is not calling. The communication status can be obtained from the Internet phone device. In this case, the list creator 22 recreates the status list as the communication status changes.

The status selector 23 selects one of the status items in the status list according to the operational status of the application. The status selector 23 stores the selected status as the current status. Then, the status selector 23 sends the current status to the communicator 24. The current status to be sent out can be either the same as the status in the status list, or any information such as a status ID which can identify the status.

The communicator 24 sends out the status list and the current status to a transmitting device 3 for communication. The communicator 24 also sends out user identification information along with the status list and the current status. An example of a manner of sending information is by low-powered wireless transmission employed in a so-called cordless phone. Or, by providing a battery charger of the mobile terminal with a communication function so as to communicate with the information terminal PC1, the mobile terminal can receive data from the generating device 2 whenever it is placed on the charger. Furthermore, a connection portion that connects with the mobile terminal M could be provided on the communicator 24 of the information terminal PC1—a form in which the two would be line-linked.

This embodiment takes the example in which data in transmission/reception between the two is wireless. In this case, the communicator 24 determines whether or not there is a transmitting device 3 in an area within which wireless communication can reach. If the communicator 24 finds a transmitting device 3 within the area, then the communicator 24 sends data to all transmitting devices 3 that are in the area within which wireless communication can reach.

Transmitting Device

The transmitting device 3 is disposed inside a mobile terminal that can connect to a mobile communications network, such as a mobile phone or a PHS ("Personal Handyphone System," a Japanese version of a system for individualized telecommunications). The status notification device can run on the mobile terminal. By connecting to the Internet via the mobile communications network, the mobile terminal can, on the status notification device, establish communication with the information terminal PC2.

The mobile terminal stores user identification information that is for specifying a user to be detected. The user identification information is, for instance, a log-in name or an account name. The user identification information of a mobile terminal should be configured as needed by using a registering function, or by storing the user information in an SIM (Subscriber Identity Device) card and inserting the card in the mobile terminal prior to using the mobile terminal.

The transmitting device 3 includes a receiver 31, a user identifier 32, a list sender 33, a status sender 34, and a communicator 35.

The receiver 31 receives a status list and current status along with user identification information from any desired generating device 2 on an information terminal PC1. An example of ways of receiving information includes by low-powered wireless communications employed in a so-called cordless phone. By providing the battery charger of the mobile terminal with a function for communication with the information terminal PC1, the mobile terminal can receive data from the generating device 2 whenever the mobile terminal is placed on the charger. If the communicator 31 of the mobile terminal M is provided with a connection portion that connects with the information terminal PC1, the mobile terminal M and the information terminal PC1 may be line linked.

As mentioned above, the present embodiment takes an example where the mobile terminal M receives data wirelessly. In this case, the receiver 31 determines whether or not there is a generating device 2 in an area within which wireless communication can reach. If the receiver 31 determines that a generating device 2 is present, then the receiver 31 waits to receive data from all of the generating devices. The receiver 31 separates the user identification information from the data in order to send the user identification information to the user identifier 32. Based on the result of comparisons among the user identification information, which will be described in detail later, the receiver 31 also separates the status list and current status in order to send the status list to the list sender 33 and the current status to the status sender 34.

The user identifier 32 compares the user identification information it received from the generating device, with the user identification information that has been stored in the mobile terminal in advance. The user identifier 32 notifies the receiver 31 of the result of the comparison.

The list sender 33 receives the status list from the receiver 31 based on the result of the comparison. The list sender 33 converts the format of the status list to a predetermined one, such that the status list can be sent to the communicator 35 in the predetermined format. The predetermined format is, more specifically, a format specified by the status notification device. Particularly, the format includes information specifying that the content of the notification is a status list.

The status sender 34 receives a current status from the receiver 31, based on the result of the above-described comparison. The status sender 34 converts the format of the current status to a predetermined one, such that the current status can be sent to the sender 35 in the predetermined format. This conversion takes place in a similar manner as in the foregoing case. However, the format includes distinguishing information for specifying that the content is a status, instead of distinguishing information for a status list.

The communicator 35 receives data from the above-described list sender 33 and the status sender 34, and sends them to a designated information terminal PC2 via the status notification device. Herein, the communicator 35 determines prior to sending the data whether or not the mobile terminal M and the information terminal PC2 are connected via the status notification device.

Receiving Device

The receiving device 4 is provided on the information terminal PC2 for running the status notification. The information terminal PC2 can communicate with the mobile terminal M via the status notification device by connecting to the Internet.

The receiving device 4 includes a communicator 41, a memory 42, a list updater 43, a status updater 44, and a display module 45.

The communicator 41 receives the status list and the current status from the mobile terminal M via the status notification device. The communicator 41 determines, prior to receiving data, whether or not the receiving device and the mobile terminal M are connected via the status notification device.

The memory 42 stores the status list and the current status it received.

The list updater 43 receives the status list from the mobile terminal M via the communicator 41. If the list updater 43 received a status list that is different from the status list stored in the memory 42, the list updater 43 stores the former in the memory 42. The list updater 43 sends the status list to the display module 45.

The status updater 44 receives the current status from the mobile terminal M via the communicator 41. If the status updater 44 has received a current status that is different from the current status stored in the memory 42, then the status updater 44 stores the former in the memory 42. The status updater notifies the display module 45 of the current status.

The display module 45 outputs the status list and the current status on a display. FIG. 4 is an example of the status list and the current list being displayed. The reverse portion in the status list indicates the current status. The user name can also be displayed along with the status list, by storing the user names for all the mobile terminals M. If the status list includes graphical data and/or sound data, it is also possible to perform status notification based on such data.

Process Flow

Process flow in the generating device, the transmitting device, and the receiving device, which form the status notification system, will now be explained.

(1) Generating Device

Figure 5:
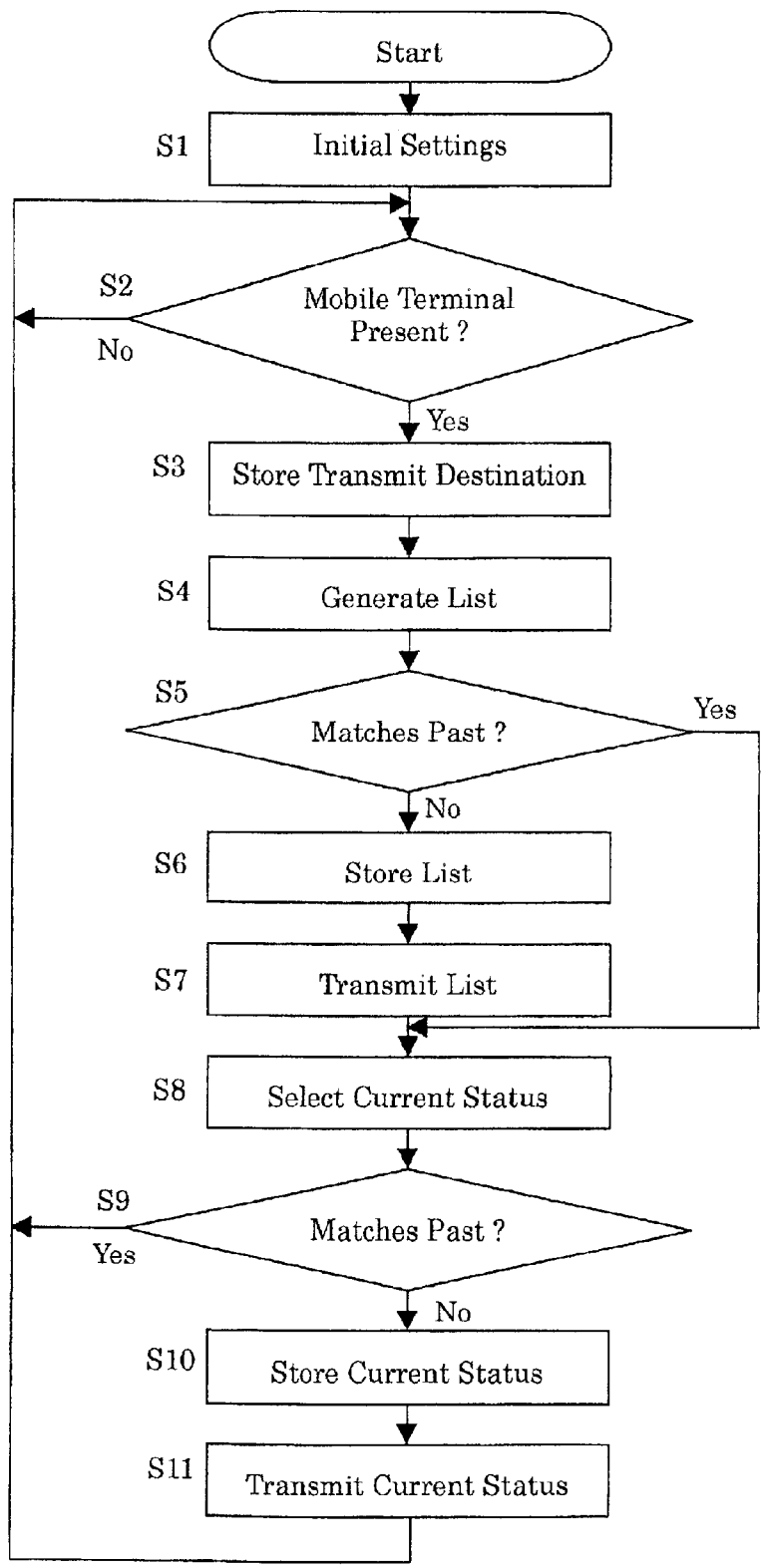
FIG. 5 is a flowchart of generating device operation.

FIG. 5 is a flowchart of the operation of the generating device. As a predetermined application, i.e., the electronic mail device starts on the information terminal PC1, the following process begins.

In step S1, the generating device performs predetermined initial settings. More specifically, the user identifier 21 obtains user identification information such as a password or a user ID from the electronic mail device. The list creator 22 clears a buffer in which the status list is to be stored. The status selector 23 clears a buffer in which the current status is to be stored. Further, the communicator 24 clears a buffer in which the receiving mobile terminal M is to be stored.

In step S2, the communicator 24 determines whether or not there is a transmitting device 3 within an area that is communicable by wireless communication. If the generating device 2 and the transmitting device 3 do not communicate by wireless communication, the communicator 24 determines in another way whether or not a transmitting device is present. For instance, if the generating device 2 and the transmitting device 3 communicate through a line, the generating device 2 determines whether or not it is connected to a predetermined communication port.

In step S3, the communicator 24 stores the communication addresses of communications-enabled mobile terminals M. The address in this case is a phone number, if the communication is through low-powered wireless communication employed in a cordless phone. This process is not necessary if the generating device 2 and the transmitting device 3 communicate through a line, or the generating device 2 simultaneously broadcasts data without specifying to which transmitting devices 3 the data should be sent. It is also possible that there is a plurality of mobile terminals within the communications area.

In step S4, the list creator 22 creates a status list in response to the electronic mail device. If there is a plurality of receiving mobile terminals M, the list creator 22 can create a status list for each mobile terminal.

In step S5, the list creator 22 determines whether or not the status list stored in the buffer coincides with the newly created status list. These status lists do not coincide right after the application has started. If the list creator 22 determines that the result is "Yes," then step S8, which will be described later, ensues. In this case, since the status list has not changed, there is no need to send the new status list. If the list creator 22 determines that the result is "No," then step S6 ensues.

In step S6, the list creator 22 stores the newly created status list in the buffer.

In the step S7, the list creator 22 sends the most recent status list to the communicator 24. The communicator 24 sends the status list and user identification information it received to the receiving mobile terminal M stored in the buffer.

In step S8, the status selector 23 selects one of the status items in the status list as a current status, based on the operative status of the electronic mail device. For instance, if there are more than ten unread electronic mail messages, the status selector 23 selects "You have a lot of mail" as the current status.

In step S9, the status selector 23 determines whether or not the current status stored in the buffer coincides with the current status newly selected. If the status selector 23 determines that the result is "Yes," then the generating device 2 returns to the aforementioned step S2. In other words, since the current status has not changed, there is no need to send the newly selected current status. If the status selector 23 determines that the result is "No," then step S10 ensues.

In step S10, the status selector 23 stores the newly selected current status in the buffer.

In step S11, the status selector 23 sends the newly selected current status to the communicator 24. The communicator 24 sends the newly selected current status and the user identification information to the mobile terminal M stored in the buffer, to which the data should be sent.

(2) Transmitting Device

Figure 6:
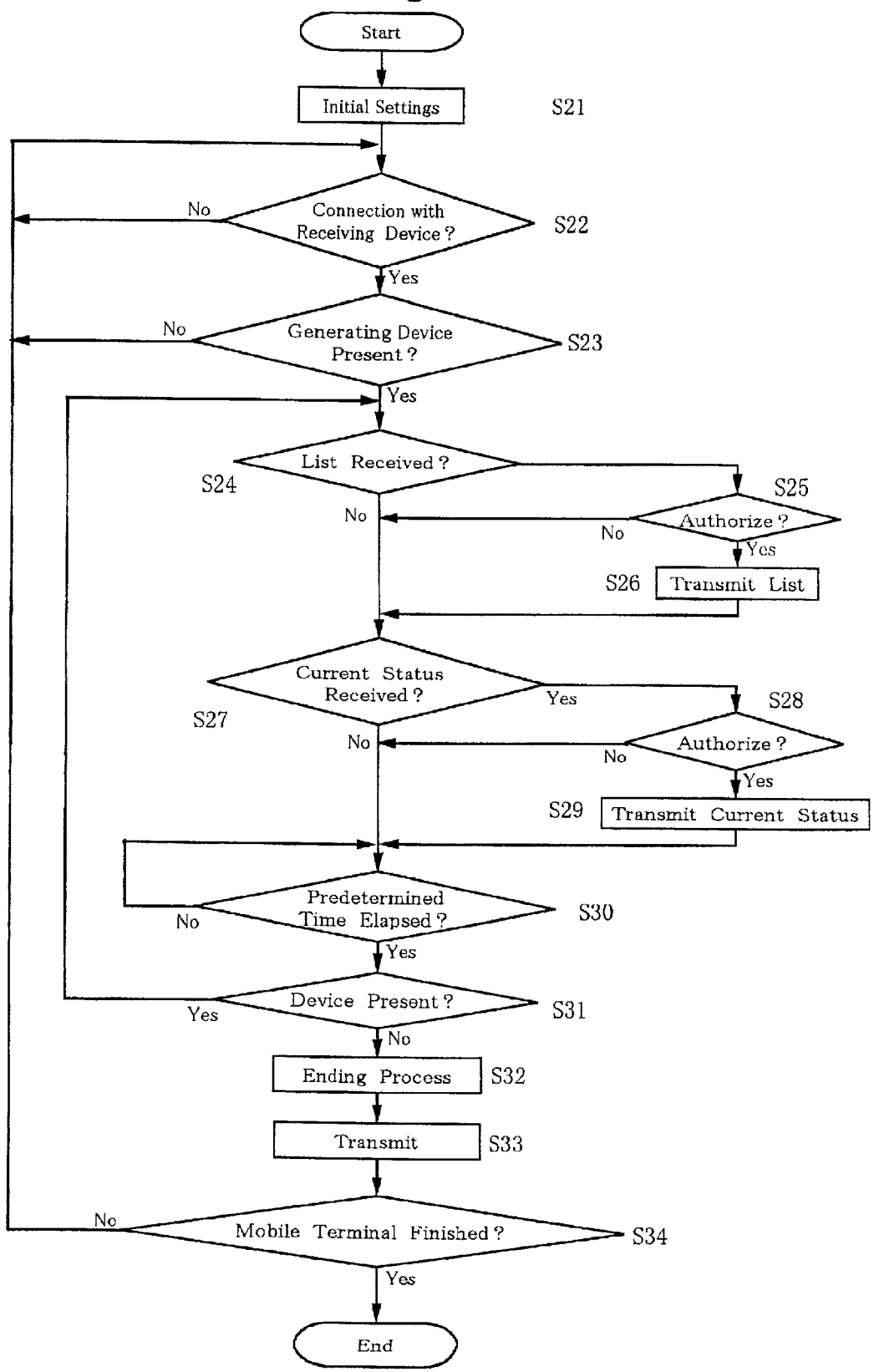
FIG. 6 is a flowchart of transmitting device operation.

Reference is now made to FIG. 6, the chart diagramming process flow in the transmitting device 3. The following processes begin as the status notification device on the mobile terminal M starts up. When the status notification device starts, it establishes communication with the receiving device 4 according to the initial settings configured by the user.

In step S21, the transmitting device 3 performs predetermined initial settings. That is, the receiver 31 clears a buffer that stores the information terminal PC1. The list sender 33 clears a buffer that stores the status list. The status sender 34 clears a buffer that stores the current status.

In step S22, the communicator 35 determines whether or not the transmitting device 3 can communicate with the information terminal PC2 via the status notification devices in real time.

In step S23, the receiver 31 determines whether or not there is an information terminal PC1 within the wireless communications area. If there is no generating device, the transmitting device 3 returns to the aforementioned step S21 to repeat the above-described processes. If there is a generating device, step S24 ensues.

In step S24, the receiver 31 determines whether or not it has received a status list. If the result is "Yes," then step S25 ensues. If the result is "No," then step S27, which will be described later, ensues.

In step S25, the user identifier 32 determines whether or not it should authorize the generating device 2. This determination is based on whether or not the user identification information matches. If the result is "Yes," then step S26 ensues. If the result is "No," then later described step S27 ensues.

In step S26, the receiver 31 sends the status list to the list sender 33, based on the result of the aforementioned authorization. The list sender 33 converts the format of the status list, and sends the status list to the communicator 35. The communicator 35 sends the status list to the information terminal PC2 via the status notification device.

In steep S27, the receiver 31 determines whether or not it has received the current status from the information terminal PC1. If the result is "Yes," then to step S28 ensues. If the result is "No," then step S30 ensues.

In step S28, the user identifier 32 determines whether or not it should authorize the generating device 2 in a manner similar to the preceding step. If the result is "Yes," then step S29 ensues. If the result is "No," step S30 ensues.

In step S29, the receiver 31 sends the current status to the status sender 34 based on the authorization result. The status sender 34 converts the format of the current status and sends the current status to the communicator 35. The communicator 35 sends the current status to the information terminal PC2 via the status notification device.

In step S30, the receiver 31 stands by for a predetermined period of time; step S31 ensues when the predetermined period of time has elapsed.

In step S31, the receiver 31 determines whether or not a generating device for communication is present, as in the aforementioned step S23. If the result is "Yes," then step S24 ensues, wherein the foregoing processes are repeated. If the result is "No," step S32 ensues.

In step S32, the transmitting device 3 performs a predetermined ending routine. More specifically, the list sender 33 and the status sender 34 clear the status list and the current status in the buffer.

In step S33, the cleared status list and current status are sent to the information terminal PC2 via the communicator 35 and the status notification device. As a result, the receiving device 4 displays blank status list and current status, such that the user is notified that the generating device 2 and the transmitting device 3 are disconnected.

In step S34, the communicator 35 determines whether or not the status notification device on the mobile terminal M has finished. If the result is "No," the transmitting device 3 returns to the aforementioned step S22. If the result is "Yes," the process is terminated.

(3) Receiving Device

Figure 7:
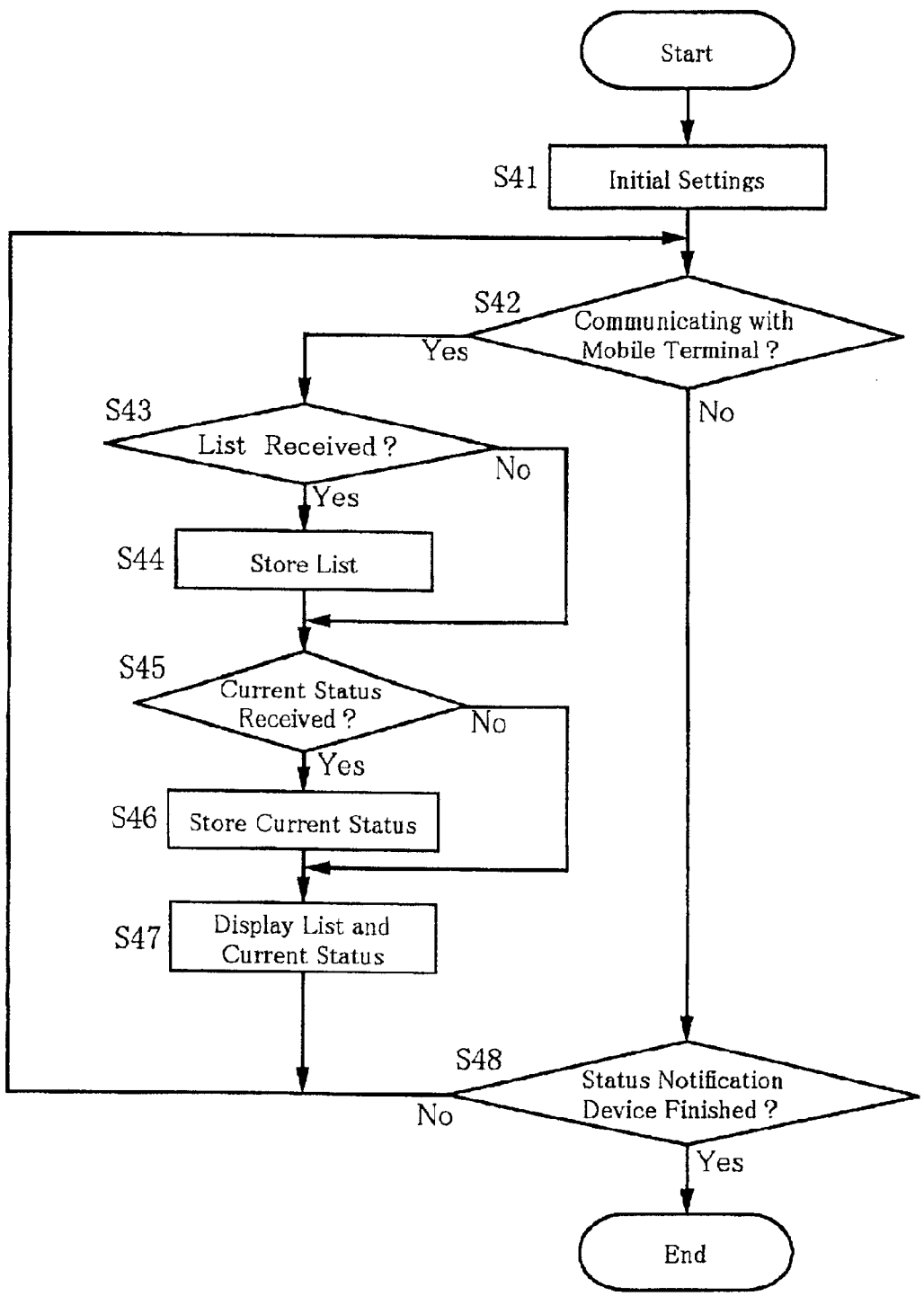
FIG. 7 is a flowchart of receiving device operation.

Reference is made now to FIG. 7, a chart diagramming process flow in the receiving device 4. The following process begins as the status notification device on the information terminal PC2 starts up. When the status notification device boots, it establishes communication with the transmitting device 3 according to the initial settings configured by the user.

In step S41, the receiving device 4 performs predetermined initial settings. More specifically, the list updater 43 clears the status list in the memory 42, while the status updater 44 clears the current status.

In step S42, the communicator 41 determines whether or not the receiving device 4 can communicate with the designated mobile terminal M via the status notification device in real time. If the result is "Yes," then step S43 ensues. If the result is "No," step 48 ensues.

In step S43, the communicator 41 determines whether or not it has received the status list from the mobile terminal M. If the result is "Yes," step S44 ensues. If the result is "No," step S45 ensues.

In step S44, the communicator 41 sends the status list it received to the list updater 43. The list updater 43 converts the format of the status list to a predetermined format such that the status list can be displayed. Then the list updater 43 stores the status list in the memory 42. It is also possible to have the list updater 43 store the status list only when the status list it received is different from the status list stored in the memory 42.

In step S45, the communicator 41 determines whether or not it has received the current status from the mobile terminal M. If the result is "Yes," then step S46 ensues. If the result is "No," step S47 ensues.

In step S46, the communicator 41 sends the current status it received to the status updater 44. The status updater 44 converts the format of the current status it received to a predetermined format such that the current status can be displayed. Then the status updater 44 stores the current status in the memory 42.

In step S47, the list updater 43 and the status updater 44 display the new status list and the current status in the display module 45. The display module 45 displays a predetermined window on a display, thereby outputting the status list and the current status it has obtained. It is also possible to make the display module 45 not update the display if there is no change in the status list and the current status.

In step S48, the communicator 41 determines whether or not the status notification device has finished. If the result is "No," the receiving device 4 returns to the aforementioned step S42 to repeat the above-described processes. If the result is "Yes," the process is terminated. In other words, the receiving device 4 waits for status notification from the transmitting device M via the status notification device, and displays the status notification when received.

According to this embodiment, the generating device 2 can make notifications that suit the application. Therefore, the notifications are accurate with respect to the user status. The information terminal PC1 in which the generating device 2 operates only has to be able to communicate with the mobile terminal M. In other words, it does not matter whether or not the information terminal PC1 belongs to a network, or has a status notification device therein. The mobile terminal M can send the user status to the receiving device 4 via the transmitting device 3 as long as the mobile terminal M is within communication range of the information terminal PC2 via the mobile communication network and the Internet. What is more, the communication between the transmitting device 3 and the receiving device 4 is enabled using existing status notification devices and existing communication systems. Therefore, the status notification system of the present embodiment can be set up quite readily. It is also possible to enlarge the area within which the user status can be communicated. Furthermore, by configuring the generating device 2 according to the application of the information terminal PC2, the system can report user status in great detail.

Other Embodiments (a) In the first embodiment, user status is reported from the status of one application. However, an information terminal ordinarily can run a plurality of applications. In that case, generating devices can be provided for every application.

Also, in the first embodiment, the generating device is provided peripheral to the application. However, it is also possible to configure the generating device incorporated into the application.

(b) Alternatively in the first embodiment, the system can report only the current status, without reporting the status list. In this case, the list creator 22, the generating device 2 and the list sender 33 of the transmitting device 3, and the list updater 43 of the receiving device 4 are not necessary. As the list selector 23 detects the status of the application as in the first embodiment, the list selector 23 reports the detected status. However, the status selector 23 reports the detected status in a designated way, such as in text data. For instance, if the application is an electronic mail device, the status selector 23 detects the number of unread mail items, and sends a text message such as "You have 30 unread messages" to the transmitting device 3. The transmitting device 3 sends the text message to the receiving device 4 in the foregoing manner via the status notification device. The text message is shown on a display by the receiving device 4.

(c) In the first embodiment, the list creator 22 of the generating device 2 creates a status list compatible with the application. This does not mean that there is only one list that can be created for one application. The list creator 22 can create an even more accurate state list as needed. More specific examples follow below.

An employee A, who is at a business trip destination, starts up the electronic mail device in the morning to read electronic mail that he has received by then. Thereafter, leaves his desk for a while, with the electronic mail device running. A receives more mail while he is away. In this case, an employee B, who supervises A, may want to know whether A has many mail messages because he has not checked his mail, or because he did check his mail but received more thereafter. When this is the case, the list creator 22 can create the following status list based on the status change of the electronic mail device.

1) You have a lot of mail;
2) You have mail;
3) You have received much more mail;
4) You have received more mail.

In the status list above, 1) and 2) indicate that A has not read his mail at all since starting up the electronic mail; 3) and 4) indicate that A has read his mail, but he has received more thereafter. In this manner, the person who is notified of the status can determine whether A has not read his mail at all or, or there is a one-time accumulation.

When different users use the same application, a status list should be created for each user of the application. This is because different users tend to have different application status and hence different status lists, even though the users are using the same application, since the status list is created based on the status change of the application, such as in this and the aforementioned Internet phone examples.

By employing the present invention, a user can be notified of user status items and notify other users of his user status accurately, in a wide range, and in real time.

While only selected embodiments have been chosen to illustrate the present invention, to those skilled in the art it will be apparent from this disclosure that various changes and modifications can be made herein without departing from the scope of the invention as defined in the appended claims. Furthermore, the foregoing description of the embodiments according to the present invention is provided for illustration only, and not for the purpose of limiting the invention as defined by the appended claims and their equivalents.

What is claimed is:

1. A status notification method comprising:

determining status of a user using a first information terminal;

directly transmitting the status of the user from the first information terminal, via an ad hoc local area network operating under an ad hoc communication protocol, to a mobile terminal of the user on a mobile communications network operating under a mobile communication protocol different from the ad hoc communication protocol of the ad hoc local area network;

determining at the user mobile terminal whether the received status of the mobile terminal user from the first information terminal is one of a plurality of user statuses previously stored in the user mobile terminal;

transmitting the received user status in real-time from the user mobile terminal, via the mobile communications network and other network operating under other communication protocol different from the mobile communication protocol of the mobile terminal, to a predetermined second information terminal, which is discommunicative with the first information terminal and provided on the other network, according to the determining; and outputting at the second information terminal, the user status received from the user mobile terminal via the mobile communications network and the other network.

2. A status notification method as set forth in claim 1, wherein the ad hoc local area network is a wireless electronic communications channel.

3. A status notification method as set forth in claim 1, wherein the ad hoc local area network is a wire electronic communications line.

4. A status notification system, comprising:
at least one first information terminal comprising a user status generating device determining an identity and a status of a user according to a status of the first information terminal and directly transmitting, via an ad hoc local area network operating under an ad hoc communication protocol, the determined user identity and the user status in real-time;

a mobile terminal of the user in communication with the at least one first information terminal via the ad hoc local area network and directly receiving the mobile terminal user identity and status transmitted in real-time via the ad hoc local area network from the at least one first information terminal, determining whether the received mobile terminal user identity matches a user identity stored in the user mobile terminal, and transmitting the received mobile terminal user status, according to the determining, via a mobile communications network operating under a mobile communication protocol different from the ad hoc communication protocol of the ad hoc local area network; and a second information terminal, which is discommunicative with the first information terminal and provided on other network operating under other communication protocol different from the mobile communication protocol of the at least one mobile terminal, and receiving the user status transmitted from the user mobile terminal via the mobile communications network and the other network, and outputting the received user status.

5. The status notification system as set forth in claim 4, wherein said generating device, based on the status of the first information terminals, prepare a status list listing each possible status of the user, select one of the user statuses from the status list, and transmit both the status list and the selected user status to the mobile information terminal which transmits both the status list and the select user status to the second information terminal.

6. The system of claim 4, wherein the mobile terminal of the user and the at least one first information terminal automatically connect to each other according to the ad hoc local area network, if the mobile terminal is within a predetermined communication range of the at least one first information terminal.

7. The system of claim 4, wherein the user status generating device of the first information terminal determines the identity of the user according to a password or a user name input by the user when booting the first information terminal.

8. The system of claim 4, wherein the mobile terminal of the user and the at least one first information terminal are in communication by a wire or a wireless ad hoc local area network.

9. The system of claim 4, wherein a plurality of mobile terminals are in communication with the at least one first information terminal via the ad hoc local area network and the user status generating device of the at least one first information terminal determines the user identity and status of each mobile terminal user and transmits the determined user identity and status to each respective user mobile terminal via the ad hoc local area network.

10. The system of claim 4, wherein the user status is determined according to a status of at least one executing application by the user in the at least one first information terminal and the user status comprises at least one of email status information, Internet telephone usage information, and computer file usage information.

11. The system of claim 4, wherein the user status generating device is a component of an executing application by the user in the at least one first information terminal and the user status is determined by the application component according to a status of the executing application.

12. The system of claim 4, wherein the user status is determined according to a status of at least one executing application by the user in the at least one first information terminal and the executing applications comprise at least one of a text editor, an Internet phone application, and an email application.

13. The system of claim 4, wherein a plurality of user mobile terminals are in communication with the at least one first information terminal via the ad hoc local area network; and
the user status generating device of the at least one first information terminal determines each user identity and transmits each determined user identity to each respective user mobile terminal via the ad hoc local area network, and determines each user status according to a status of at least one executing application by each user in the at least one first information terminal and transmits each determined user status to each respective user mobile terminal via the ad hoc local area network.

14. A user status generating device provided in an information terminal running a predetermined application, comprising:
identification means for obtaining from the running application identification information of a user of the running application;
decision means for determining a status of the user based on a status of the running application; and
transmitting means for directly connecting, via an ad hoc local area network operating under an ad hoc communication protocol, with an external mobile terminal of the user on a mobile communications network operating under a mobile communication protocol different from the ad hoc communication protocol of the ad hoc local area network, and transmitting the user identification information and the user status to the external mobile terminal of the user via the ad hoc local area network, wherein the external mobile terminal transmits the received user status, via the mobile communications network and other network operating under other communication protocol different from the mobile communication protocol of the mobile terminal, to a second information terminal, which is discommunicative with the first information terminal and provided on the other network.

15. The system of claim 14, wherein the identification means obtains the user identification information according to a password or a user name input by the user to the application.

16. A mobile terminal transmitting device on a mobile communications network operating under a mobile communication protocol, said transmitting device, comprising:

receiving means for directly connecting in real-time with an external information terminal through an ad hoc local area network operating under an ad hoc communication protocol different from the mobile communication protocol of the mobile terminal, and receiving identification information and a status of a user of the mobile terminal from the connected external information terminal via the ad hoc local area network;

authorization means for authorizing the user of the mobile terminal based on the mobile terminal user identification information received via the ad hoc local area network from the external information terminal; and transmitting means for transmitting the received mobile terminal user status to another communication device, which is discommunicative with the external information terminal and provided on other network operating under other communication protocol different from the mobile communication protocol of the mobile terminal, via the mobile communications network and the other network, based on the authorizing.

17. A mobile terminal transmitting device on a mobile communications network operating under a mobile communication network, said transmitting device comprising:

storage means for storing user identification information for authorization of an external device that reports a status of the user of the mobile terminal, via an ad hoc local area network operating under an ad hoc communication protocol different from the mobile communication protocol of the mobile terminal;

receiving means for directly connecting in real-time with the external information terminal through the ad hoc local area network and receiving identification information and the status of the user of the mobile terminal from the connected external information terminal via the ad hoc local area network;

authorization means for authorizing the user of the mobile terminal based on the mobile terminal user identification information received via the ad hoc local area network and the stored user identification information; and transmitting means for transmitting the received mobile terminal user status to another network device, which is discommunicative with the external information terminal and provided on other network operating under other communication protocol different from the mobile communication protocol of the mobile terminal, via the mobile communications network and the other network, based on the authorizing.

18. A computer-readable recording medium wherein a user-status-generating program is stored to control information terminals, which run a predetermined application, according to a process comprising:

obtaining from the running application identification information of a user of the running application;

determining a status of the user based on a status of the running application;

connecting directly to an external mobile terminal of the user through an ad hoc local area network operating under an ad hoc communication protocol; and transmitting, via the ad hoc local area network, the user identification information and the user status to the external mobile terminal of the user on a mobile communications network operating under a mobile communication protocol different from the ad hoc communication protocol of the ad hoc local area network, wherein the external mobile terminal transmits the received user status, via the mobile communications network and other network operating under other communication protocol different from the mobile communication protocol of the mobile terminal, to a second information terminal, which is discommunicative with the first information terminal and provided on the other network.

19. A computer-readable recording medium storing a mobile-terminal status-transmitting program controlling a user mobile terminal on a mobile communications network operating under a mobile communication protocol, according to a process comprising:

connecting directly in real-time to an external information terminal through an ad hoc local area network operating under an ad hoc communication protocol different from the mobile communication protocol of the mobile terminal;

receiving, via the ad hoc local area network, identification information and a status of a user of the mobile terminal from the connected external information terminal;

authorizing the mobile terminal user based on the mobile terminal user identification information received via the ad hoc local area network from the external information terminal;

transmitting the received mobile terminal user status to another communication device, which is discommunicative with the external information terminal and provided on other network operating under other communication protocol different from the mobile communication protocol of the mobile terminal, via the mobile communications network and the other network, via the mobile communications network and the other network, based on the authorizing.

20. A computer-readable recording medium storing a mobile terminal status-transmitting program controlling a mobile terminal on a mobile communications network operating under a mobile communication protocol, according to a process comprising:

storing user identification information of the mobile terminal authorizing an external device that reports a status of the user of the mobile terminal, via an ad hoc local area network operating under an ad hoc communication protocol different from the mobile communication protocol of the mobile terminal;

connecting directly in real-time with the external information terminal through the ad hoc local area network;

receiving identification information and the status of the user of the mobile terminal from the connected external information terminal via the ad hoc local area network;

authorizing the mobile terminal user based on the user identification information received via the ad hoc local area network and the stored mobile terminal user identification information; and transmitting the received user status to another communication device, which is discommunicative with the external information terminal and provided on other network operating under other communication protocol different from the mobile communication protocol of the mobile terminal, via the mobile communications network and the other network, based on the authorizing.

* * * * *